United States Patent
Linnartz

(10) Patent No.: US 11,646,799 B2
(45) Date of Patent: May 9, 2023

(54) OPTICAL DATA TRANSMISSION SYSTEM AND METHOD

(71) Applicant: SIGNIFY HOLDING B.V., Eindhoven (NL)

(72) Inventor: Johan Paul Linnartz, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 208 days.

(21) Appl. No.: 17/258,185

(22) PCT Filed: Jun. 28, 2019

(86) PCT No.: PCT/EP2019/067384
§ 371 (c)(1),
(2) Date: Jan. 6, 2021

(87) PCT Pub. No.: WO2020/007740
PCT Pub. Date: Jan. 9, 2020

(65) Prior Publication Data
US 2021/0273729 A1 Sep. 2, 2021

(30) Foreign Application Priority Data
Jul. 6, 2018 (EP) .................................... 18182085

(51) Int. Cl.
*H04B 10/548* (2013.01)
*H04B 10/40* (2013.01)
*H04B 10/50* (2013.01)

(52) U.S. Cl.
CPC ........... *H04B 10/548* (2013.01); *H04B 10/40* (2013.01); *H04B 10/502* (2013.01)

(58) Field of Classification Search
CPC ..... H04B 10/40; H04B 10/502; H04B 10/548
(Continued)

(56) References Cited

U.S. PATENT DOCUMENTS

| 4,558,465 A | 12/1985 | Siegel et al. |
| 7,400,869 B2 * | 7/2008 | Astrachan ................ H04B 1/30 455/240.1 |

(Continued)

FOREIGN PATENT DOCUMENTS

| CN | 105763254 A | 7/2016 |
| CN | 106411403 A | 2/2017 |

(Continued)

OTHER PUBLICATIONS

Nirmal Fernando, et al., "Flip-OFDM for Optical Wireless Communications," IEEE Information Theory Workshop, 2011 (5 Pages).
(Continued)

*Primary Examiner* — Dalzid E Singh

(57) ABSTRACT

An optical data transmission system and method employs positive only data modulation, with an offset applied to the positive modulated values before generating modulated drive current signals for a light emitting component. The offset is such that the minimum drive current falls in a range where the electron-to-photon efficiency of the light emitting component is substantially constant. The drive current thus falls in a more linear part of its current vs. intensity characteristic. This reduces distortion and hence enables increased data rate.

13 Claims, 5 Drawing Sheets

(58) Field of Classification Search
USPC .......................................................... 398/135
See application file for complete search history.

(56) References Cited

U.S. PATENT DOCUMENTS

| | | | |
|---|---|---|---|
| 9,705,600 | B1 | 7/2017 | Ryan et al. |
| 10,509,295 | B2* | 12/2019 | Padmaraju .............. G02F 1/225 |
| 2012/0057872 | A1* | 3/2012 | Freda .................. H04L 27/2663 |
| | | | 398/76 |
| 2012/0257897 | A1* | 10/2012 | Hu ....................... H04B 10/548 |
| | | | 398/76 |
| 2016/0099823 | A1 | 4/2016 | Barrami |
| 2020/0162159 | A1* | 5/2020 | Wei ...................... H04B 10/116 |

FOREIGN PATENT DOCUMENTS

| | | |
|---|---|---|
| CN | 105024754 B | 7/2017 |
| JP | S59117336 A | 7/1984 |
| KR | 101618003 B1 | 5/2016 |
| WO | 2007064165 A1 | 6/2007 |
| WO | 2015134437 A1 | 9/2015 |

OTHER PUBLICATIONS

Ruowen Bai, et al., "Asymmetrically Clipped Absolute Value Optical OFDM for Intensity-Modulated Direct-Detection Systems," Journal of Lightwave Technology, Sep. 2017 (12 Pages).

Nirmal Fernando, et al., "Flip-OFDM for Unipolar Communication Systems," Department of Electrical and Computer System Engineering, Monash University, 2011 (19 Pages).

Nan Chi, et al., "Advancing the Capacity of Phosphorescent White LED Based Visible Light Communication Network," Department of Communication Science and Engineering, Shanghai, China, 2015 (2 Pages).

Shangyu Liang, et al., "Faster-Than-Nyquist Precoded Cap Modulation Visible Light Communication System Based on Nonlinear Weighted Look-Up Table Predistortion," IEEE Photonics Journal, Feb. 2018 (10 Pages).

Svilen Dimitrov, et al., "Information Rate of OFDM-Based Optical Wireless Communication Systems With Nonlinear Distortion," Journal of Lightwave Technology, Mar. 2013 (12 Pages).

* cited by examiner

OPTICAL DATA TRANSMISSION SYSTEM AND METHOD

CROSS-REFERENCE TO PRIOR APPLICATIONS

This application is the U.S. National Phase application under 35 U.S.C. § 371 of International Application No. PCT/EP2019/067384, filed on Jun. 28, 2019, which claims the benefit of European Patent Application No. 18182085.3, filed on Jul. 6, 2018. These applications are hereby incorporated by reference herein.

FIELD OF THE INVENTION

This invention relates to an optical data transmission system and method.

BACKGROUND OF THE INVENTION

Non-coherent wireless communication methods are used for optical wireless communications. Properties such as frequency, amplitude, or intensity are used by the transmitter to send information.

The need for higher data rates in wireless communication systems and the scarcity of available unlicensed bandwidth have fueled research into the use of spectrum outside of the RF band for wireless communication. Optical wireless communication such as UV, visible light, and infrared may provide a potential for very large unlicensed bandwidth that will satisfy the bandwidth needs for current and future wireless communication applications.

Typically, first generation optical wireless communication systems may need to be non-coherent. This is due to the complexity and cost of coherent optical modulators capable of modifying the phase of the optical radiation, and also due to the difficulty of recovering phase information at the receiver due to large scattering and reflections exhibited by optical radiation in the presence of air molecules and aerosols.

In optical communications, the light output is a non-negative variable. However, commonly used communication systems rely on the transmission of both positive and negative values, as these can be emitted in any radio system by positive and negative currents and via electric fields that switch vector direction, for example.

Orthogonal Frequency Division Multiplexing OFDM is a very popular modulation method that is widely used, and is being adopted in optical communications. OFDM is a method of encoding digital data on multiple carrier frequencies. Numerous closely spaced orthogonal sub-carrier signals with overlapping spectra are emitted to carry data. Demodulation is based on Fast Fourier Transform algorithms. Each sub-carrier is modulated with a conventional modulation scheme (such as quadrature amplitude modulation or phase-shift keying) at a low symbol rate. This maintains total data rates similar to conventional single-carrier modulation schemes in the same bandwidth.

The main advantage of OFDM over single-carrier schemes is its ability to cope with severe channel conditions without complex equalization filters. The low symbol rate makes the use of a guard interval between symbols affordable, making it possible to eliminate intersymbol interference (ISI).

When the intensity of the transmitted signal is used to convey the modulated data, the system may be referred to as an Intensity-Modulated Direct Detection system (IM/DD).

When using OFDM in an IM/DD optical system, the transmitted OFDM waveform typically is real and positive so that it can be used to modulate the intensity of the waveform.

This has led to at least two implementations for non-coherent wireless OFDM: Asymmetrically-Clipped Optical OFDM (ACO-OFDM) and DC-Biased Optical OFDM (DCO-OFDM). Both methods use Hermitian symmetry of the frequency domain data to ensure a real-valued time-domain signal but they may differ in how the waveform is kept positive. In DCO-OFDM, a strong DC bias is added, strong enough such that after adding the AC modulation the occurrence of negative values is very unlikely. In ACO-OFDM a modification is such that only positive samples come out of the OFDM modulator, while it maintains attractive properties of the signal power characteristics, by avoiding a large bias.

In ACO-OFDM, the waveform may be clipped at zero whereas in DCO-OFDM, a DC offset may be added to ensure the majority of the waveform has a positive value. Using properties of the Fast Fourier Transform, FFT, an ACO-OFDM transmitter can adjust the data allocated to each subcarrier in such a way that clipping the signal at zero does not introduce any distortion. This feature may come at the expense of halving the effective number of subcarriers which can carry information. Despite making use of half the subcarriers compared to DCO-OFDM, ACO-OFDM has been shown to be the most energy efficient and the best at reducing peak-to-average power ratio (PAR).

ACO-OFDM may be the transmission technique of choice for wireless optical communications systems using IM/DD, as it may be more efficient in terms of channel capacity than On-Off-Keying (OOK) and Pulse-Position Modulation (PPM).

Another example is so-called Flip-OFDM, as described by N. Fernando et. al. in "Flip-OFDM for Optical Wireless Communications" in Information Theory Workshop (ITW), IEEE, Paraty, Brazil: IEEE, Oct. 16-20, 2011, pp. 5-9 and in WO 2007/064165 (and its equivalent US 2009/0175365). This makes use of a flipping operation to render positive the negative portions of the signal. US 2016/0099823 discloses another example which uses a clipping process.

US 2012/057872 describes an ACO-OFDM system in more detail. FIG. 1 shows an exemplary block diagram of an optical IM/DD system using ACO-OFDM. This figure is taken from US 2012/057872.

The ACO-OFDM system of FIG. 1 receives a binary input data stream. The transmit chain comprises a quadrature amplitude modulation (QAM) mapper 10, an Even Sample Zero Insert block 12, a Hermitian Symmetry block 14, an inverse Fast Fourier Transform (IFFT) unit 16, a parallel to serial converter 18, a clip block 20, an insert cyclic prefix block 22, a D/A converter 24 and an optical intensity modulator 26 (i.e. an LED). This converts to the optical domain, which forms an optical channel 28.

The OFDM symbol may consist of N complex samples taken from the QAM mapper. For ACO-OFDM, the Even Sample Zero Insert (ESZI) block takes a set of N/4 complex samples from the QAM mapper, where N is the number of samples in the FFT/IFFT, and may insert zeros at all even frequency subcarriers within the OFDM symbol such that the odd frequency subcarriers, and in some embodiments only the odd frequency subcarriers, carry information. In this way, distortion resulting from asymmetric time-domain clipping may effect only the even frequency subcarriers.

The odd frequency subcarriers may have their amplitude reduced by one-half but are otherwise undistorted. The ESZI block also may simplify the transmitter and receiver implementation to some degree, as the modulation rate may be approximately one quarter of the rate at which the FFT/IFFT is run.

The Hermitian Symmetry block may use the resulting N/2 samples to create an OFDM symbol with N samples which is Hermitian symmetric (X(N−k)=(X*(k) for k=[0, N−1]). This symmetry ensures that the unclipped time-domain signal x(n) is real-valued. The signal x(n) may be clipped at zero, perhaps following addition of a cyclic prefix (CP) of L samples, so that it can be used to intensity-modulate a source of a specific wavelength.

After propagation of the signal through a channel which exhibits absorption, scattering, and reflection, the receiver may directly detect the intensity of the received signal and may convert this intensity into an analog electrical signal.

The receive chain comprises a detector 30 (such as a photodiode), an analog to digital converter 32, a unit 36 for removing the cyclic prefix and creating an FFT window, a serial to parallel converter 38, a FFT unit 40, a channel estimation and compensation unit 42, a unit 44 for selecting odd samples and removing redundancy, and finally a quadrature amplitude modulation (QAM) demapper 46.

The receiver is similar to the standard OFDM receiver. Even-frequency carriers and redundant carriers introduced by the Hermitian Symmetry block are however not used by the QAM de-mapper.

SUMMARY OF THE INVENTION

Typically non-negative OFDM signals have a probability distribution that is a one sided Gaussian distribution, with relatively high signal density near zero. However, LEDs (to be used for generating the modulated light output) are very non-linear (in terms of their light intensity output versus drive current) near zero. This means the communication is distorted.

Thus, there remains a need for a modulation approach which is particularly suitable for optical data communication using LEDs.

The invention is defined by the claims.

According to examples in accordance with an aspect of the invention, there is provided an optical data transmission system, comprising:
  an input for receiving a data signal;
  a light emitting component;
  a modulator for modulating the data signal to provide a modulated data signal having only positive modulated values;
  an offset unit for adding a positive DC offset to said only positive modulated values; and
  a converter for generating current signals based on the offset and modulated values, thereby providing a modulated drive current signal for driving the light emitting component,
  wherein the data signal is a bi-polar data signal and
  the modulated data signal comprises a non-negative OFDM signal having a probability density function of the modulated output which has a peak at zero and
  wherein as a result of the positive DC offset added to the modulated values, the minimum drive current falls in a range where the electron-to-photon efficiency of the light emitting component is substantially constant.

This modulation system enables a light emitting component to be driven with a current which falls in a more linear part of its current vs. intensity characteristic. This is achieved by avoiding the lowest current region. This reduces distortion and hence increases the number of bits per symbol, and hence the data rate, that can be reliably communicated. In particular, reliable reproducibility of the signal is improved at the receiver. Note that the modulator, converter and offset unit are defined as separate entities, only to make the functions clear. The functions may be combined into fewer actual hardware units, for example a single digital processing unit.

The invention relates to a current driven modulation system. Such a system is inherently more linear than a voltage driven system. The linear part of the intensity versus current characteristic is for example a broader range than the linear part of a current versus voltage characteristic.

The modulated drive current signal for example comprises a LED drive current or a laser drive current. A VCSEL may for example be employed.

The offset is for example a fixed current offset. The size of the offset depends on the nominal drive current for the connected light emitting component. The offset may for example be around 20 mA for an LED, or lower for micro LEDs or higher for high power LEDs.

The offset may be fixed, so providing a translation of a current range. However, by changing a gain as well, a more complex mapping may be created. For example, the maximum current may be unchanged. Thus, the mapping created by the offset may be a scaling and translation rather than just a translation. A gain change may be implemented at the level of a digital to analog converter.

The data signal is bipolar and is converted by the modulation into only positive modulated values.

This conversion typically involves a nonlinear operation such as a clipping of signal components. Clipping involves removing all values below a certain threshold and setting these to the threshold value. If such hard clipping is used other measures may be taken to allow reconstruction of the embedded data.

This conversion may for example be done by repeating the OFDM signal, but with an inverted sign, and clipping all negative values of the two consecutive copies, similar to the Flip OFDM concepts.

The conversion may for example operate in a similar manner to a ACO-OFDM system, in which the part of the subcarriers that are mainly affected by the clipping is not used to carry data.

Another example of a non-linear operation is to create only absolute values. This is for example disclosed in Rouwen Bai et. al., "Asymmetrically Clipped Absolute Value Optical OFDM for Intensity-Modulated Direct-Detection Systems" published in the Journal of Lightwave Technology, vol. 35, Issue 17, Sep. 1, 2017.

Also other, such as invertable, non-linearities can be used to create a non-negative signal.

The system preferably further comprises a light emitting component, such as an LED, driven by the drive currents. The offset may then be selected taking into account the specific characteristics of the light emitting component used to convert the modulated data into light.

The linearity of the light output intensity of the light emitting component with respect to the drive current is preferably greater between the minimum drive current and a maximum drive current than between zero and said maximum drive current.

Note that the minimum and maximum current refer to the minimum and maximum currents as generated by the modulation system (rather than for example a maximum rated current of the LED).

Thus, the DC offset improves the linearity of the relationship between the drive current (which depends on the modulated data value) and the light output.

The minimum LED drive current provided by the modulation is for example between 0.05 and 0.2 times the maximum LED drive current provided by the modulation.

This means the light emitting component is driven with a current in a desired part of the drive characteristic. This means the linear part of the current drive characteristics is used, with a maximum modulated current in the range of between 5 and 20 times the minimum modulated current (which minimum is the result of the offset).

For an LED, the minimum drive current is for example between 1 mA and 30 mA. The maximum LED drive current is for example between 40 mA and 200 mA. However, the actual values will depend on the type of LED to be used.

In one example, the system comprises a digital to analog converter, wherein the modulator and the offset unit are provided in the digital domain before the digital to analog converter.

In another example, the system again comprises a digital to analog converter, wherein the modulator is provided in the digital domain before the analog to digital converter and the offset unit is provided in the analog domain after the digital to analog converter.

There are thus different ways to implement the offset, either in the digital or analog domain.

The modulated data signal preferably comprises a non-negative OFDM signal.

OFDM is widely used in optical data communication. The addition of the offset for an LED based system matches the modulation system with the characteristics of the LED.

The modulated data signal has a probability density function of the modulated output which has a peak at zero. The modulated data signal is before the DC offset. This type of underlying modulation scheme means the output power required to transmit the data using a light emitting component is relatively low. Even after the DC offset, it means the there is a high probability that the output is low. During idle times of no data transmission, there is accordingly a low power requirement. The probability density function for example has the shape of a ACO-OFDM scheme or a Flip OFDM scheme. This represents a reduction of wasted power compared to a DCO-OFDM scheme.

The system may further comprise a controller for selecting the positive DC offset in dependence on the characteristics of the light emitting component to be driven by the drive currents. Thus, the offset is used to provide adaptation of the modulation system to take account of the characteristics of the light emitting component rather than the properties of the modulation scheme itself.

The invention also provides an optical transceiver system, comprising:
    an optical data transmission system as defined above; and
    an optical data reception system which is adapted to receive light modulated using the modulation method of the optical data transmission system and demodulate the data signal.

This provides a unit able to perform bidirectional communication using the same modulation approach.

The invention also provides an optical data reception system, comprising:
    an input for receiving a modulated light signal generated by a light emitting component, wherein the minimum modulated light intensity corresponds to a light emitting component drive current which falls in a range where the electron-to-photon efficiency of the light emitting component is substantially constant;
    an optical sensor; and
    a demodulator for demodulating the data signal to create a received data signal.

The invention also provides an optical data transmission method, comprising:
    modulating a data signal to provide a modulated data signal having only positive modulated values;
    adding a positive DC offset to said only positive modulated values;
    generating light emitting component drive currents based on the offset and modulated values,
    driving a light emitting component using the LED drive currents.
    wherein the data signal is a bi-polar data signal;
    the modulated data signal comprises a non-negative OFDM signal having a probability density function of the modulated output which has a peak at zero and
    wherein as a result of the positive DC offset added to the modulated values, the minimum light emitting component drive current falls in a range where the electron-to-photon efficiency of the light emitting component is substantially constant.

The linearity of the LED light output intensity with respect to the light emitting component drive current is preferably greater between the minimum drive current and a maximum drive current than between zero and the maximum drive current.

The invention also provides an optical data reception method, comprising:
    receiving a modulated light signal generated by an LED, wherein the minimum modulated light intensity corresponds to an LED drive current which falls in a range where the electron-to-photon efficiency of the LED is substantially constant;
    converting the light signal to the electrical domain; and
    demodulating the data signal to create a received data signal.

The invention may be implemented at least in part in software.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
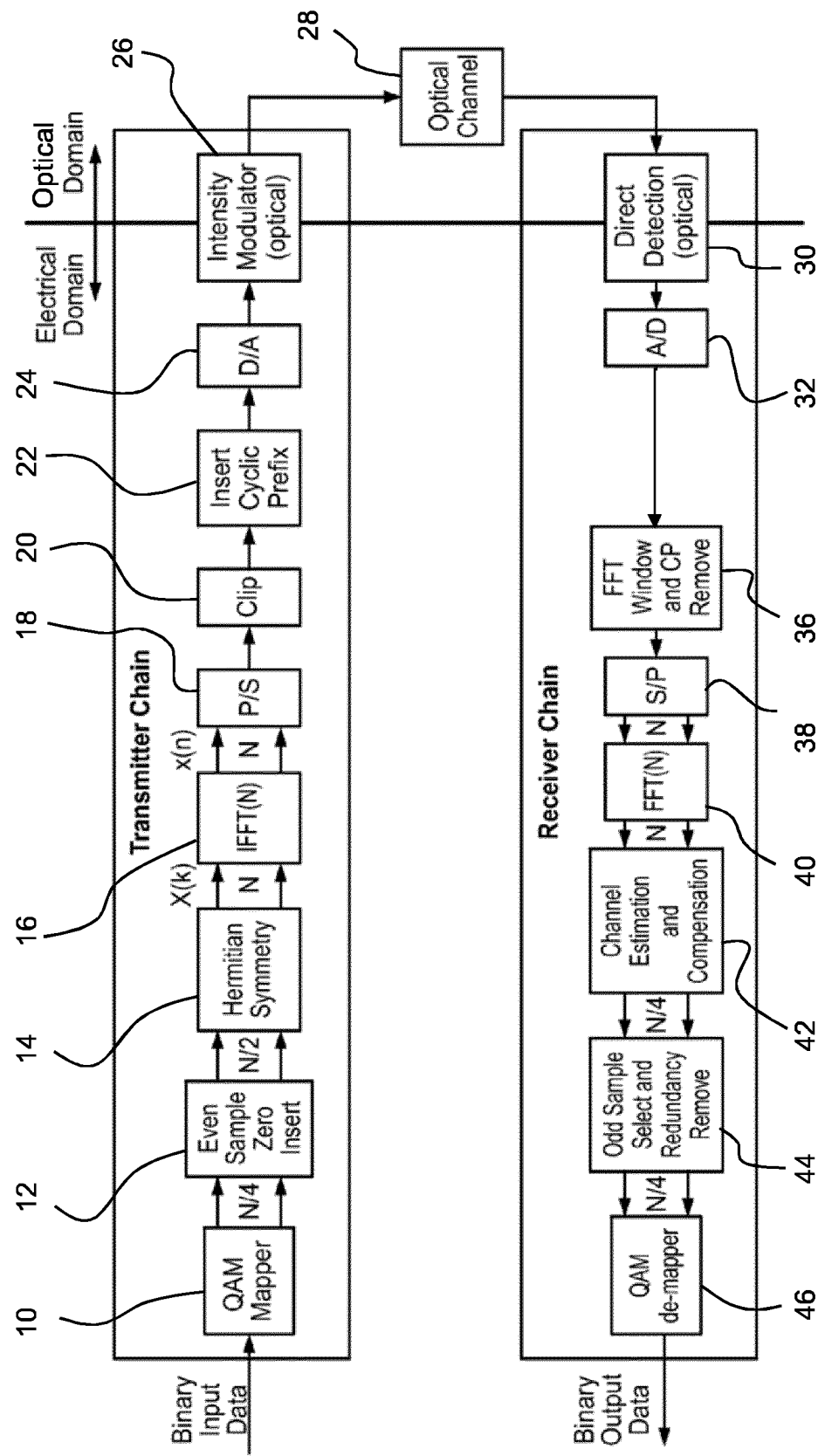
FIG. 1 shows a known architecture of a known ACO-OFDM system.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an optical data transmission system and method which employs positive only data modulation, with an offset applied to the positive modulated values before generating modulated drive current signals for a light emitting component. The offset is such that the minimum drive current falls in a range where the electron-to-photon efficiency of the light emitting component is substantially constant. The drive current thus falls in a more linear part of the current vs. intensity characteristic. This reduces distortion and hence enables increased data rate. A corresponding data reception system and method are also provided.

Figure 2:
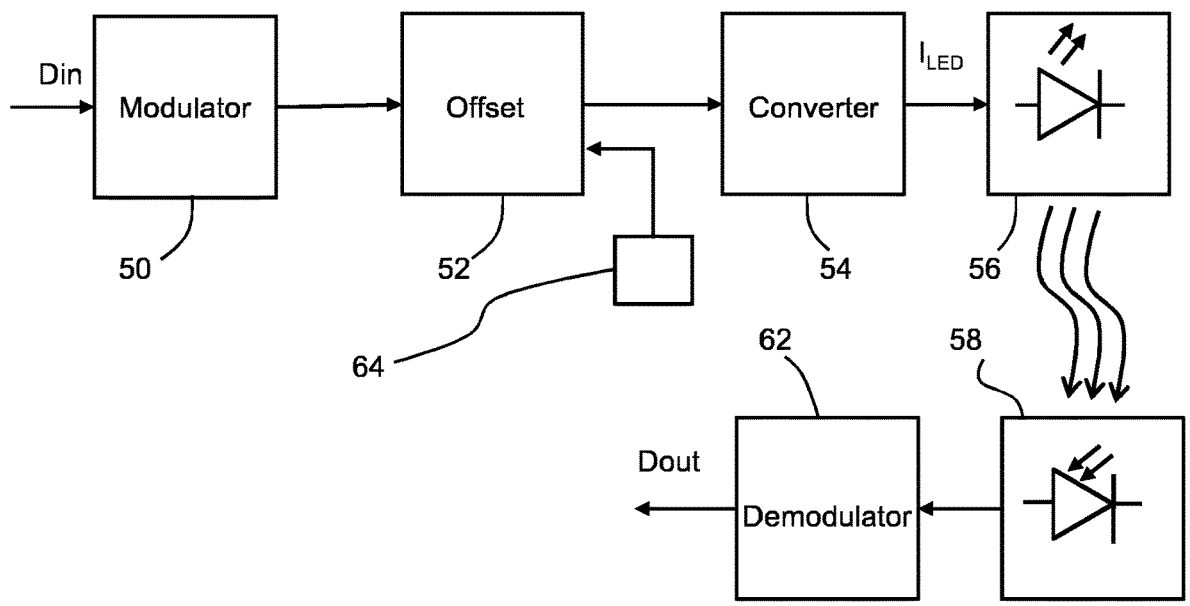
FIG. 2 shows an optical data transmission and reception system in accordance with the invention.

FIG. 2 shows an optical data transmission system and an optical data reception system. They may be used separately or together as different parts of a transceiver.

The optical data transmission system comprises an input for receiving a data signal Din, and a modulator 50 for modulating the data signal to provide a modulated data signal having only positive modulated values.

The data signal Din is bipolar and is converted by the modulation into only positive modulated values. This may for example operate in a similar manner to a ACO-OFDM system. However, the data signal Din may itself be unipolar and a different modulation scheme may be used such as Pulse Amplitude Modulation.

An offset unit 52 is used to add a positive DC offset to the positive modulated values. A converter 54 generates current signals based on the offset and modulated values, thereby providing a modulated LED drive current signal $I_{LED}$.

In preferred examples, these drive currents are used to drive an LED 56, which functions as an electro-optical converter. Other electro-optical converters may be used, which may have different electron-to-photon efficiency characteristics, such as VSCELs (vertical-cavity surface-emitting lasers). Generally, the invention relates to current-driven solid state light sources. The description below is based on the example of an LED as the electro-optical converter.

The offset may be applied before conversion to an LED drive current (as shown in FIG. 2), or after. Furthermore, in practice, the modulator and offset unit may be implemented as a single digital signal processor if they are both applied in the digital domain, before digital to analog conversion which takes place as part of the function of the converter 54.

The offset for example is, or results in, a fixed current offset. The size of the offset which is appropriate depends on characteristics of the connected LED, such as the nominal drive current. The offset may for example be around 20 mA, or lower for micro LEDs or higher for high power LEDs.

The offset may be fixed, so providing a translation of a current range. However, by changing a gain as well, the mapping created by the the offset may be a scaling and translation rather than just a translation. A gain change may be implemented at the level of a digital to analog converter.

The receiving system comprises an optical sensor such as a photodiode 58 and a demodulator 62.

A controller 64 is optionally provided for setting or controlling the offset applied by the offset unit 52. This enables the offset (offset amount or else offset function) to be tailored to the particular LED 56.

Figure 3:
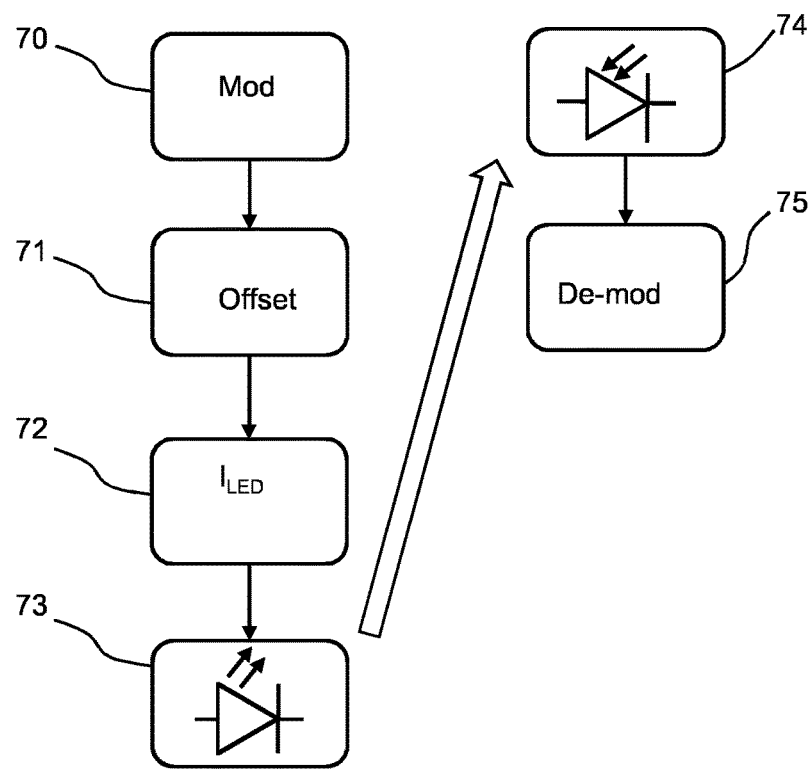
FIG. 3 shows an optical data transmission and reception method.

FIG. 3 shows an optical data transmission method, comprising:

in step 70, modulating a data signal to provide a modulated data signal having only positive modulated values;

in step 71, adding a positive DC offset to said only positive modulated values;

in step 72, generating LED drive currents based on the offset and modulated values; and in step 73, driving an LED using the LED drive currents.

FIG. 3 also shows the subsequent data reception method, comprising:

in step 74, receiving the modulated optical signal and converting to the electrical domain;

in step 75, performing demodulation.

The purpose of the offset is to drive the LED with a current which falls in a more linear part of its current vs. intensity characteristic. This is achieved by avoiding the lowest current region. This reduces distortion and hence increases the number of bits per symbol, and hence the data rate, that can be reliably communicated. In particular, reliable reproducibility of the signal is improved at the receiver.

At the reception side, there will already be an offset resulting from the optical transmission of the data signal. A conventional system for example includes a high pass filter to remove 50 Hz or 100 Hz flicker in the light, and this also functions to remove the DC offset introduced at the transmission side. Thus, no modification is required as the reception side to receive and demodulate the signal.

Figure 4:
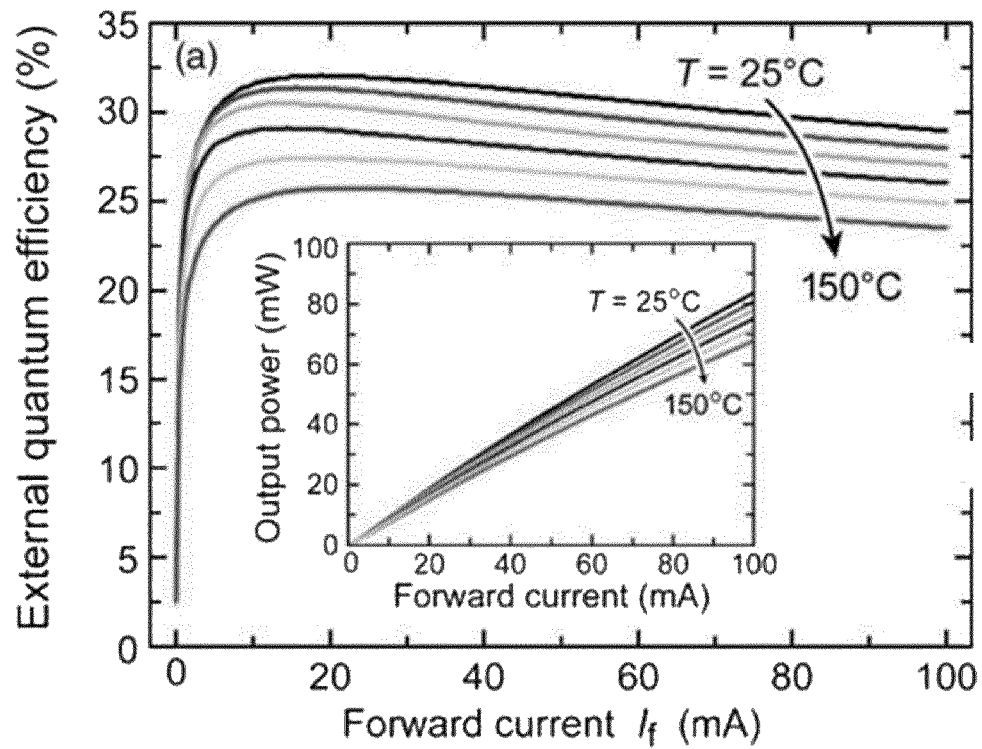
FIG. 4 shows quantum efficiency and the output power of an LED as a function of drive current.

FIG. 4 as the main plot shows the external quantum efficiency of one particular LED (a GaInN/GaN microwave LED with wavelength 450 nm) as a function of the forward current. This example has a normal forward current up to around 100 mA. The quantum efficiency rises steeply as the current increases to around 10 mA then becomes substantially constant. Thus, the electron-to-photon efficiency of the LED is substantially constant after a minimum drive current of around 10 mA.

The actual efficiency depends on temperature, as shown.

FIG. 4 also shows as the inserted plot the optical output power as a function of the forward current. The relationship is generally linear, apart from a region at low current. This means that the linearity of the LED light output intensity with respect to the LED drive current is greater between the a non-zero minimum LED drive current (corresponding to the offset) and a maximum LED drive current, than between zero and the maximum LED drive current. This linearity is the closeness of fit to a straight line graph and may be determined by any suitable mathematical method. The use of the offset thus means that the LED 56 is driven with a current which falls in a more linear part of its current vs. intensity characteristic. This is achieved by avoiding the lowest current region.

Note that the minimum and maximum currents referred to above relate to the minimum and maximum currents as generated by the modulation system.

Figure 5:
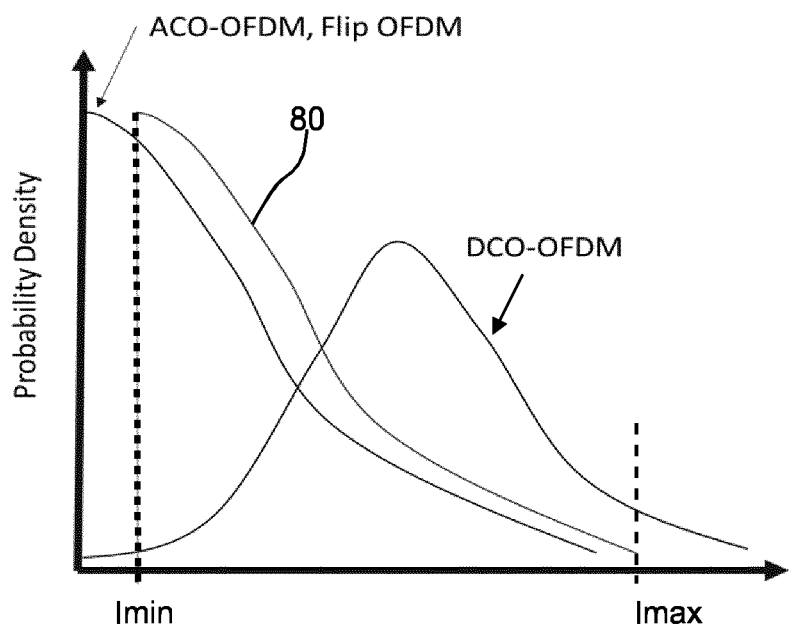
FIG. 5 shows the probability density function for an ACO-OFDM system, a DCO-OFDM system and one example of a modulation system in accordance with the invention.

FIG. 5 shows the probability density of LED drive currents when the modulation scheme is applied. It shows the one-sided Gaussian distribution for the ACO-OFDM and Flip-OFDM schemes and the shifted Gaussian distribution for the DCO-OFDM scheme.

Plot 80 is the distribution for the approach of the invention. There is a minimum drive current Imin below which the probability is zero.

The invention makes use of a modulation scheme, in which before the application of the offset, the modulated data signal has a probability density function with a peak at zero. This type of underlying modulation scheme means the output power required to transmit the data using an LED is relatively low.

The approach of the invention, which combines the use of a modified (non-negative) OFDM approach with an additional offset in the current, leads to an attractive probability density of the signal. There remains a high probability that the LED output is low even after the DC offset. Thus, during idle periods (inactivity of the link) minimal power is emitted, whereas the DCO-OFDM approach emits a large amount of DC power which does not contribute to communication.

The known modified (non-negative) OFDM approaches typically do not avoid that there are occasional high positive peaks. However, there are several reasons why this is not considered problematic.

First of all, it is well known that the reception of OFDM is not dramatically impaired if the modulator clips excessive positive peaks. It has been shown repeatedly that one may safely remove peaks beyond 3 sigma, i.e., three times the rms current, or peaks that occur during less than 0.1% or 1% of the time, without causing significant amounts of bit errors.

Secondly, even if the electronic circuitry would feed these into the LEDs, these are rare and brief. Typically, the capacitance of the LED acts as a short and eliminates its harmful effect on the junction. Moreover short periods of high current burst will not heat up the LED significantly, thus are not likely to risk damaging the LED, and the communication link experiences these as a low-pass behavior that is well treated by OFDM.

The minimum LED drive current Imin provided by the modulation is for example between 0.05 and 0.2 times the maximum LED drive current Imax provided by the modulation. This means the linear part of the current drive characteristics is used, with a maximum modulated current Imax in the range of 5 to 20 times the minimum modulated current Imin.

The minimum LED drive current is for example between 1 mA and 30 mA and the maximum LED drive current is then between 5 and 20 times the minimum as explained above. The maximum LED drive current is for example between 40 mA and 200 mA.

As mentioned above, one possible way to implement the invention is to modify the known ACO-OFDM approach of FIG. 1.

Figure 6:
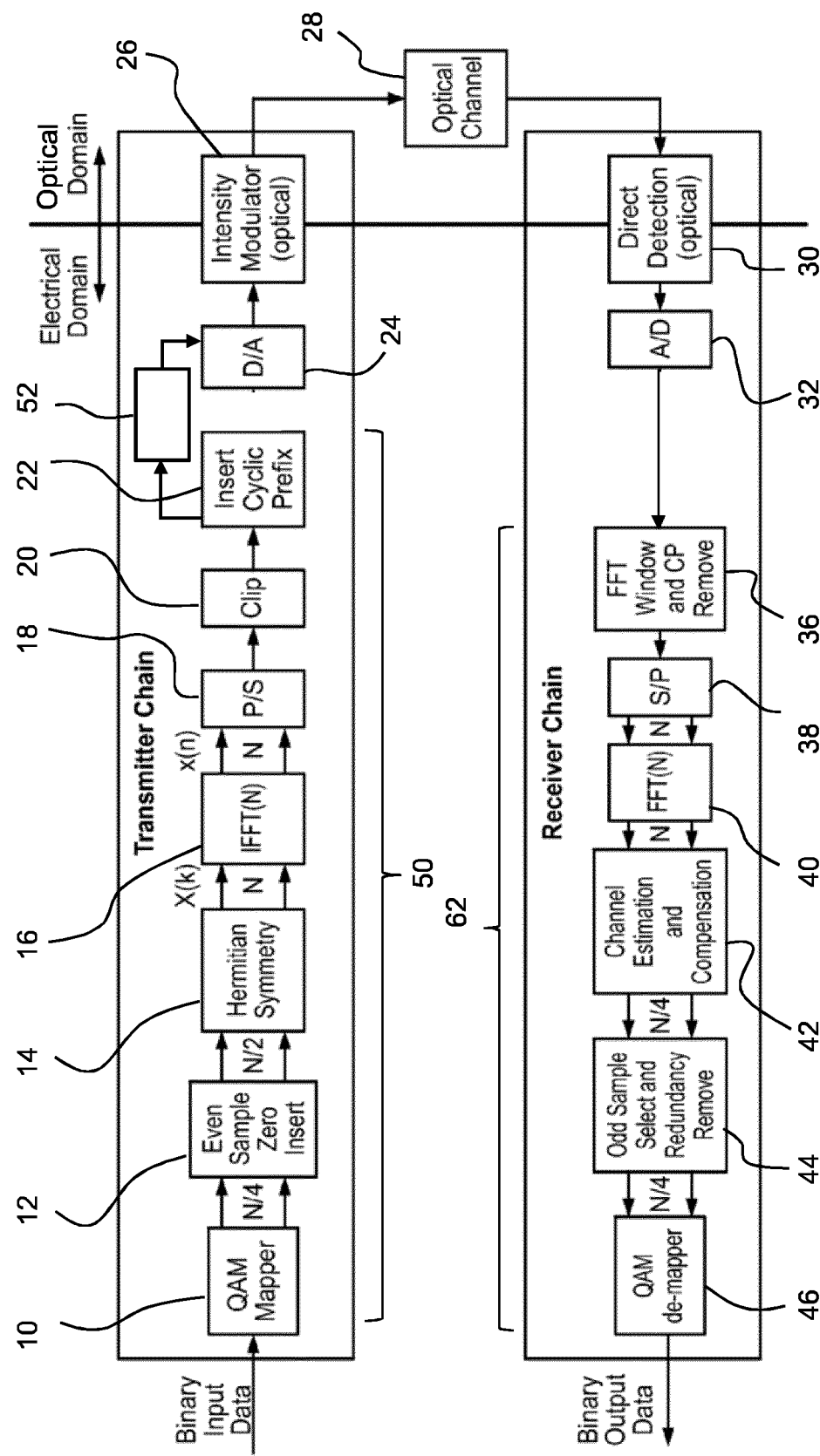
FIG. 6 shows a first example of how to modify the system of FIG. 1 to provide a system in accordance with the invention.

FIG. 6 shows a first possible modification to the approach of FIG. 1. The offset unit 52 is provided at the end of the digital signal processing. Thus, the system comprises a digital to analog converter 24, wherein the modulator and the offset unit are provided in the digital domain before the digital to analog converter. The modulator 50 of FIG. 2 may be considered to comprise all of the elements 10,12,14,16, 18,20 and 22. The offset unit 52 of FIG. 2 is shown as unit 52 in FIG. 6. The converter 54 of FIG. 2 is then implemented by the D/A converter 24. The demodulator 62 of FIG. 2 comprises the units 36, 38, 40, 42, 44, and 46.

Figure 7:
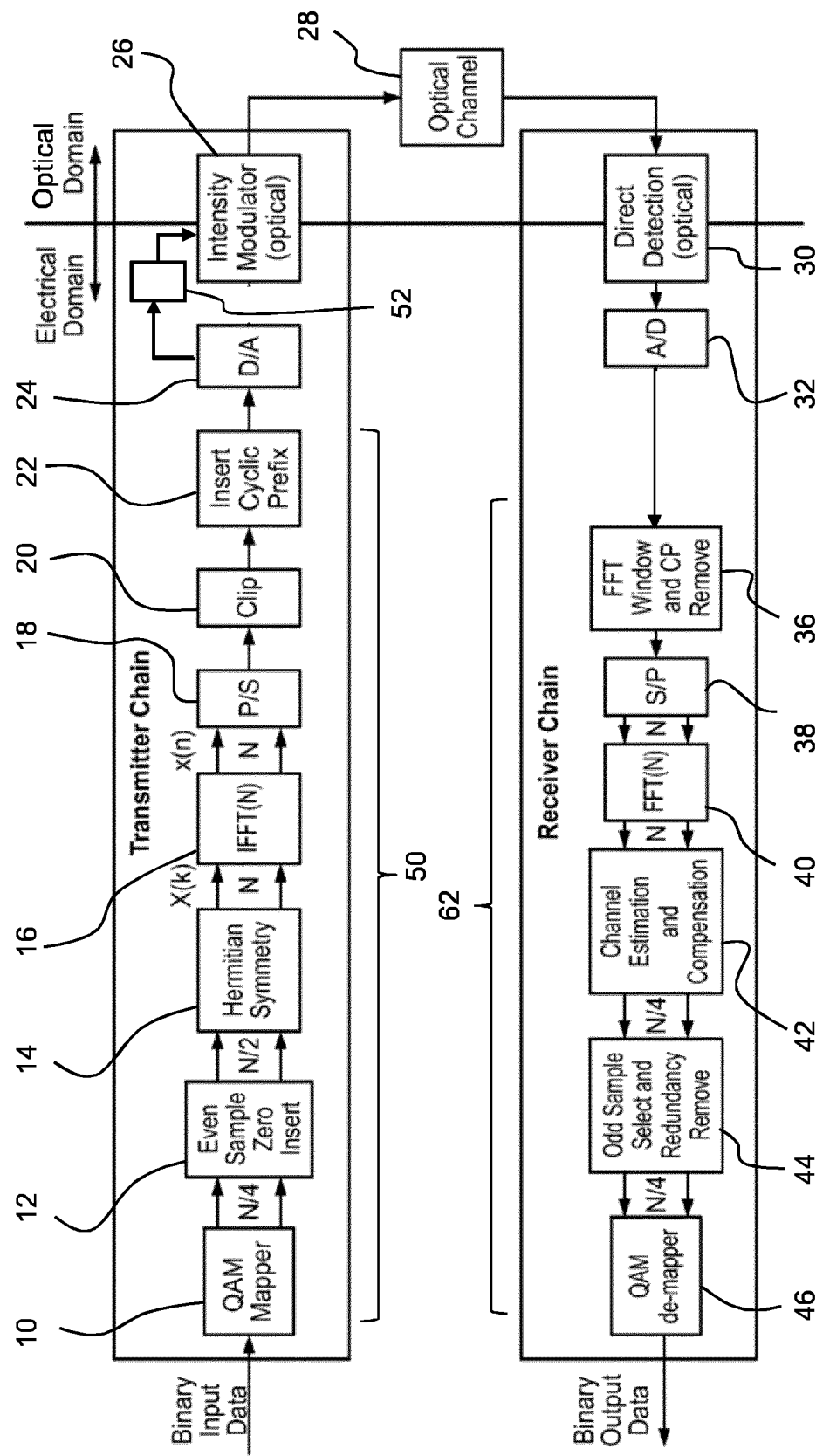
FIG. 7 shows a second example of how to modify the system of FIG. 1 to provide a system in accordance with the invention.

FIG. 7 shows a second possible modification to the approach of FIG. 1. The offset unit 52 is provided in the analog domain. Thus, the system comprises a digital to analog converter 24, the modulator is provided in the digital domain before the analog to digital converter and the offset unit 52 is provided in the analog domain after the digital to analog converter 24. The modulator 50 of FIG. 2 may again be considered to comprise all of the elements 10,12,14,16, 18,20 and 22. The converter 54 of FIG. 2 is then implemented by the D/A converter 24. The offset unit 52 of FIG. 2 is shown as unit 52 in FIG. 7 after the D/A converter 24. Again, the demodulator 62 of FIG. 2 comprises the units 36, 38, 40, 42, 44, and 46.

There are thus different ways to implement the offset, either in the digital or analog domain.

As mentioned above, the offset that is appropriate will depend on the LED used for electro-optical conversion.

The offset may be variable depending on the LED. This may be achieved by having a look up table of LEDs types to which the transmitter may be coupled, and the transmitter is then calibrated to a particular LED type. This may be based on user input during an installation stage, or it may be based on automatic detection of the particular LED type, for example by probing the LED characteristics based on transmitted and received signals of a transmitter-receiver pair.

The offset may be a simple level shift, or a level shift with scaling, as mentioned above. In a more complex approach, the offset may be implemented as a function which aims to linearize a known intensity versus drive current characteristic of a particular light emitting component. Thus, the offset comprises a function which is related to an inverse of the static or dynamic intensity versus current function of the light emitting component, such as LED. In this way, it can be ensured that the LED drive current levels map to evenly spaced light intensity levels.

At high data speeds, the inverse function preferably is dynamic, i.e., it can also involve the history of the current in the preceding microseconds to account for hole-electron pair built up, in the various regions of the LED junction. For example, a full non-linear pre-distorter may be applied.

The invention has been shown in detail as a modification to an ACO-OFDM system. However, the invention may be applied as a modification to other modulation techniques such as a pulse amplitude modulation (PAM) technique.

The invention is for example of interest for visible light communication (VLC) or IR communications. The advantage of the use of light is that it can be constrained to remain in a desired space, so that interference issues are avoided. There is reduced latency by avoiding message collisions giving improved quality of service. VLC also cannot be jammed and is more difficult to eavesdrop.

As discussed above, embodiments make use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An optical data transmission system, comprising:
an input for receiving a data signal;
a light emitting component;
a modulator for modulating the data signal to provide a modulated data signal having only positive modulated values;
an offset unit for adding a positive DC offset to said only positive modulated values; and
a converter for generating current signals based on the offset and modulated values, thereby providing a modulated drive current signal for driving the light emitting component,
wherein the data signal is a bi-polar data signal and the modulated data signal comprises a non-negative OFDM signal having a probability density function of the modulated output which has a peak at zero and wherein as a result of the positive DC offset added to the modulated values, the minimum drive current falls in a range where the electron-to-photon efficiency of the light emitting component is substantially constant.

2. The system as claimed in claim 1, wherein the light emitting component comprises an LED and the minimum LED drive current provided by the modulation is between 0.05 and 0.2 times the maximum LED drive current provided by the modulation.

3. The system as claimed in claim 1, wherein the modulated drive current signal comprises a LED drive current.

4. The system as claimed in claim 1, wherein the data signal is converted by a non-linear operation into only positive modulated values.

5. The system as claimed in claim 1, wherein the light emitting component comprises an LED, and wherein the linearity of the LED light output intensity with respect to the LED drive current is greater between the minimum LED drive current and a maximum LED drive current than between zero and said maximum LED drive current.

6. The system as claimed in claim 1, wherein the system comprises a digital to analog converter, wherein the modulator and the offset unit are provided in the digital domain before the digital to analog converter.

7. The system as claimed in claim 1, wherein the system comprises a digital to analog converter, wherein the modulator is provided in the digital domain before the analog to digital converter and the offset unit is provided in the analog domain after the digital to analog converter.

8. The system as claimed in claim 1, further comprising a controller for selecting the positive DC offset in dependence on the characteristics of the light emitting component to be driven by the drive currents.

9. An optical transceiver system, comprising:
the optical data transmission system as claimed in claim 1; and
an optical data reception system comprising
a photo diode arranged to receive light transmitted by the optical data transmission system and convert it to the electrical domain, and
an non-negative OFDM signal demodulator arranged to demodulate the data signal from the photo diode output.

10. An optical data transmission method, comprising:
modulating a data signal to provide a modulated data signal having only positive modulated values;
adding a positive DC offset to said only positive modulated values;
generating light emitting component drive currents based on the offset and modulated values,
driving a light emitting component using the drive currents,
wherein the data signal is a bi-polar data signal and
the modulated data signal comprises a non-negative OFDM signal having a probability density function of the modulated output which has a peak at zero and
wherein as a result of the positive DC offset added to the modulated values, the minimum drive current falls in a range where the electron-to-photon efficiency of the light emitting component is constant.

11. The method as claimed in claim 10, wherein the light emitting component comprises an LED and the linearity of the LED light output intensity with respect to the LED drive current is greater between the minimum LED drive current and a maximum LED drive current than between zero and the maximum LED drive current.

12. The method as claimed in claim 10, wherein modulating the data signal comprising applying a non-negative OFDM modulation to the bipolar data signal.

13. A non-transitory computer readable medium having a computer program stored therein, which is adapted, when said program is run on a computer, to implement the processing step of the method of claim 10.

* * * * *